(12) United States Patent
Sherman

(10) Patent No.: US 7,793,960 B2
(45) Date of Patent: Sep. 14, 2010

(54) BICYCLE WHEEL MOUNTING ASSEMBLY

(76) Inventor: Aleksandr Sherman, 4038 Surf Ave., Brooklyn, NY (US) 11224

(*) Notice: Subject to any disclaimer, the term of this patent is extended or adjusted under 35 U.S.C. 154(b) by 269 days.

(21) Appl. No.: 12/080,233

(22) Filed: Apr. 1, 2008

(65) Prior Publication Data

US 2009/0243252 A1   Oct. 1, 2009

(51) Int. Cl.
*B62K 25/04* (2006.01)

(52) U.S. Cl. .................................. 280/288

(58) Field of Classification Search ............. 280/281.1, 280/288
See application file for complete search history.

(56) References Cited

U.S. PATENT DOCUMENTS

| | | | |
|---|---|---|---|
| 4,170,369 A * | 10/1979 | Strutman | 280/261 |
| 4,390,191 A * | 6/1983 | Acker | 280/281.1 |
| 4,659,097 A * | 4/1987 | Kupper et al. | 280/281.1 |
| 5,295,702 A * | 3/1994 | Buell | 280/284 |
| 5,332,246 A * | 7/1994 | Buell | 280/284 |
| 5,413,368 A * | 5/1995 | Pong et al. | 280/277 |
| 6,910,702 B1 * | 6/2005 | Hals | 280/286 |

FOREIGN PATENT DOCUMENTS

EP   284535 A1 *  9/1988

* cited by examiner

*Primary Examiner*—Kevin Hurley
(74) *Attorney, Agent, or Firm*—Kirschstein, et al.

(57) ABSTRACT

A rear frame support structure mounts a bicycle wheel for rotation about an axis during bicycle motion, and has a pair of arms spaced axially apart of each other and axially offset from a same axial side of the wheel to enable axial movement of the wheel relative to the arms when the bicycle is not in motion. A drive mechanism is supported by both arms, for enabling the wheel to be driven during bicycle motion. The drive mechanism remains supported by both arms during the axial movement of the wheel.

15 Claims, 3 Drawing Sheets

BICYCLE WHEEL MOUNTING ASSEMBLY

BACKGROUND OF THE INVENTION

1. Field of the Invention

The present invention generally relates to bicycles and like wheeled vehicles and, more particularly, to bicycle wheel mounting assemblies for axial mounting of a bicycle wheel on, and axial removal of the bicycle wheel from, a bicycle frame, while maintaining a wheel drive mechanism securely in place on the frame throughout the mounting and the removal of the wheel.

2. Description of the Related Art

Wheel maintenance on bicycles is often laborious. Conventional bicycles have front forked frame struts that straddle both sides of a front wheel, and rear forked frame struts that straddle both sides of a rear wheel, thereby making wheel replacement difficult. The rear wheel typically has a hub equipped with, and coupled to, a drive mechanism, which conventionally includes an axle, a gear changer, a clutch and a braking assembly. The presence of the drive mechanism makes wheel repair and replacement, as well as security removal, especially time-consuming, since a flat rear wheel has to be decoupled from the drive mechanism prior to being radially removed from between the rear struts.

In U.S. Pat. No. 6,979,012, I proposed removing a rear wheel axially along its axis of rotation from a bicycle frame. In one embodiment, one of the frame supports straddling one side of the rear wheel was pivoted radially out of the way to permit the axial removal, while another of the frame supports straddling an opposite side of the rear wheel remained in place. In another embodiment, only a single frame support was used to support the rear wheel. Also, U.S. Pat. No. 4,170,369 and U.S. Pat. No. 2,497,121 disclosed single frame supports for supporting the rear wheel at only one side thereof.

As advantageous as these patented wheel mounting assemblies were, after removal of the wheel, the drive mechanism was supported at only one axial end by a single frame support. Due to lack of a secure support, the drive mechanism was subject to tilting due to a relatively large lever torquing moment. Once the drive mechanism is out of its true position, the return of the wheel on a tilted drive mechanism requires a wheel alignment procedure, which is typically performed not by a user, but by a bicycle repair shop with calibrated equipment.

SUMMARY OF THE INVENTION

Objects of the Invention

One object of this invention is to enable rapid removal of, and easy access to, a rear wheel of a bicycle to effect repairs or replacement, or as a security measure.

Another object of this invention is to enable removal of the rear wheel without also removing the drive mechanism.

Still another object of this invention is to securely support the drive mechanism during removal and mounting of a wheel.

Still another object of this invention is to minimize a torquing moment of the drive mechanism.

FEATURES OF THE INVENTION

In keeping with these objects and others that will become apparent hereinafter, one feature of this invention resides, briefly stated, in a bicycle assembly that includes a frame support structure for mounting a bicycle wheel for rotation about an axis during bicycle motion. The support structure has a pair of arms spaced axially apart of each other and axially offset from a same axial side of the wheel to enable axial movement of the wheel relative to the arms when the bicycle is not in motion. The bicycle assembly further includes a drive mechanism supported by both arms, for enabling the wheel to be driven during bicycle motion. The drive mechanism remains supported by both arms during the axial movement of the wheel.

Thus, in accordance with this invention, the drive mechanism is not supported, as in the prior art, at only one axial end by a single frame support, but instead, is supported at two axially spaced-apart locations to obtain a secure, strong support. The drive mechanism is not subject to tilting during wheel removal or mounting. The wheel can be axially decoupled from, or axially coupled to, the drive mechanism without fear that the drive mechanism has been moved out of its true position symmetrical with the axis.

The drive mechanism advantageously includes an axle extending along the axis, a clutch, a gear changer and a disc brake. The axle is journaled within the drive mechanism at two locations spaced axially apart. A coupler is operative for coupling the drive mechanism to, and decoupling the drive mechanism from, a hub of the wheel. The hub is a cylindrical sleeve, and the drive mechanism includes a cylindrical housing axially slidable into and out of the sleeve.

Two wheels are aligned along a longitudinal axis of a main bicycle frame. The frame support structure is connected to a rear region of the frame and is axially offset from the longitudinal axis. The frame includes a rear tube, and the frame support structure is preferably welded to the rear tube. Both arms have planar portions in mutual parallelism and lying in planes generally perpendicular to the axis.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
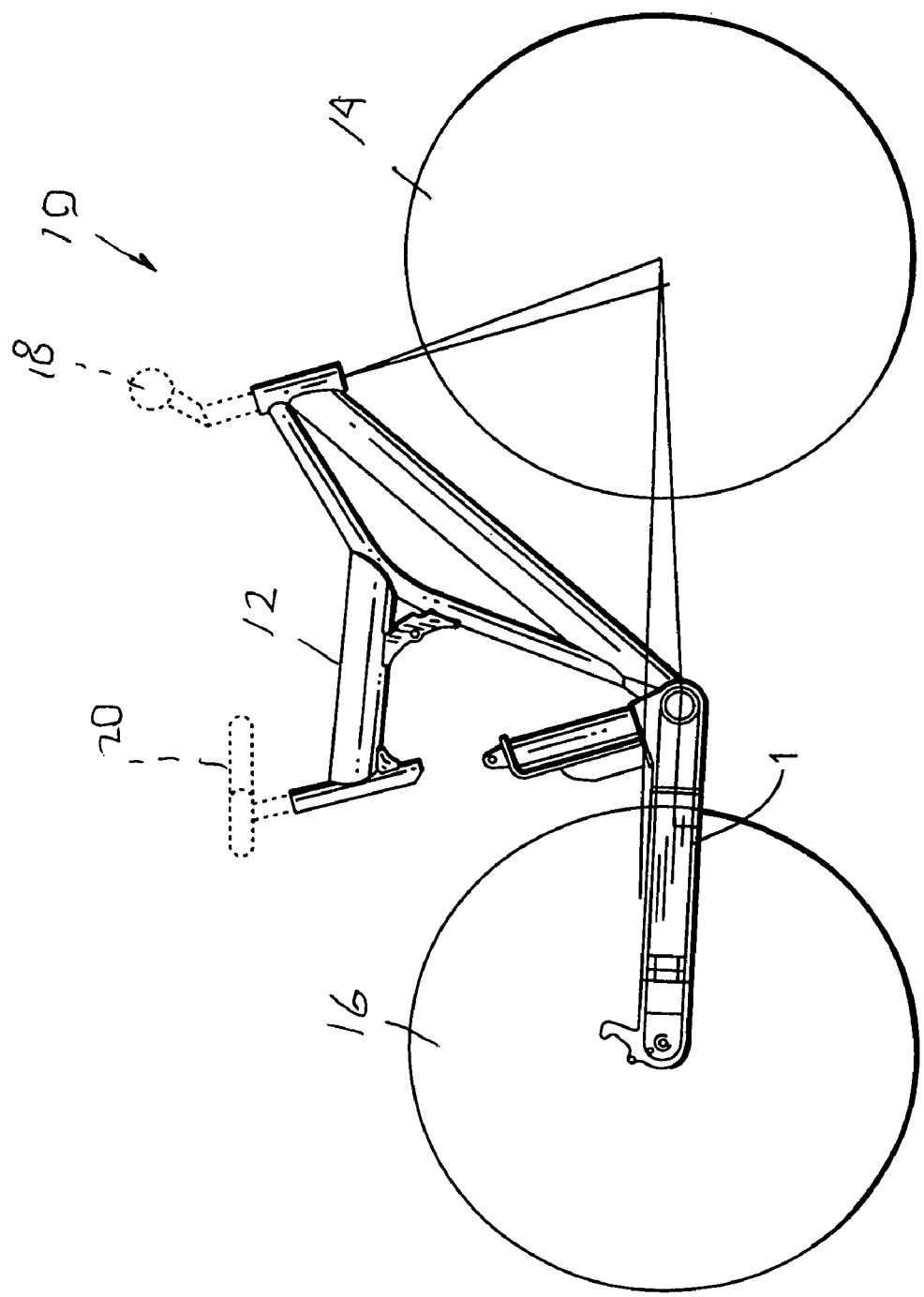
FIG. 1 is a broken-away, side elevational view of a bicycle having a wheel mounting assembly in accordance with this invention.

Referring to FIG. 1, a bicycle 10 includes a main frame 12, a front wheel 14, a rear wheel 16, handlebars 18 (shown in phantom), a seat 20 (also shown in phantom), and a foot pedal assembly (not illustrated). The main frame 12 includes a rear, bifurcated or forked, frame support structure 22 (see FIG. 2) for mounting a bicycle wheel, e.g., the rear wheel 16, for rotation about an axis 24 during bicycle motion. The bifurcated support structure 22 has a pair of arms 26, 28 spaced axially apart of each other and axially offset from a same axial side of the wheel 16 to enable axial movement of the wheel 16 relative to the arms 26, 28 when the bicycle is not in motion. The bicycle assembly further includes a drive mechanism 30 supported by both arms 26, 28, for enabling the wheel 16 to be driven during bicycle motion. The drive mechanism 30 remains supported by both arms 26, 28 during the axial movement of the wheel 16, as shown in phantom in FIG. 2.

Thus, in accordance with this invention, the drive mechanism 30 is not supported, as in the prior art, at only one axial end by a single frame support, but instead, is supported at two axially spaced-apart locations on the arms 26, 28 to obtain a secure, strong support. The drive mechanism 30 is not subject to tilting during wheel removal or mounting. The wheel 16 can be axially decoupled from, or axially coupled to, the drive mechanism 30 by a coupler, e.g., a pair of bolts or fasteners 32, without fear that the drive mechanism 30 has been moved out of its true position symmetrical with the axis 24.

The drive mechanism 30 advantageously includes an axle 34 extending along the axis 24, a clutch with wheel gears 36 and a disc brake 38. The axle 34 is journaled within the drive mechanism 30 at two locations spaced axially apart. The coupler 32 is operative for coupling the drive mechanism 30 to, and decoupling the drive mechanism 30 from, a hub 40 of the wheel 16. The hub 40 is a cylindrical sleeve, and the drive mechanism 30 includes a cylindrical housing 42 axially slidable into and out of the sleeve.

The wheels 14, 16 are aligned along a longitudinal axis of the main bicycle frame 12. The frame support structure 22 is connected to a rear region of the frame 12 and is axially offset from the longitudinal axis. The frame 12 includes a rear tube, and the frame support structure 22 is preferably welded to the rear tube. Both arms 26, 28 have planar portions in mutual parallelism and lying in planes generally perpendicular to the axis 24.

Figure 2:
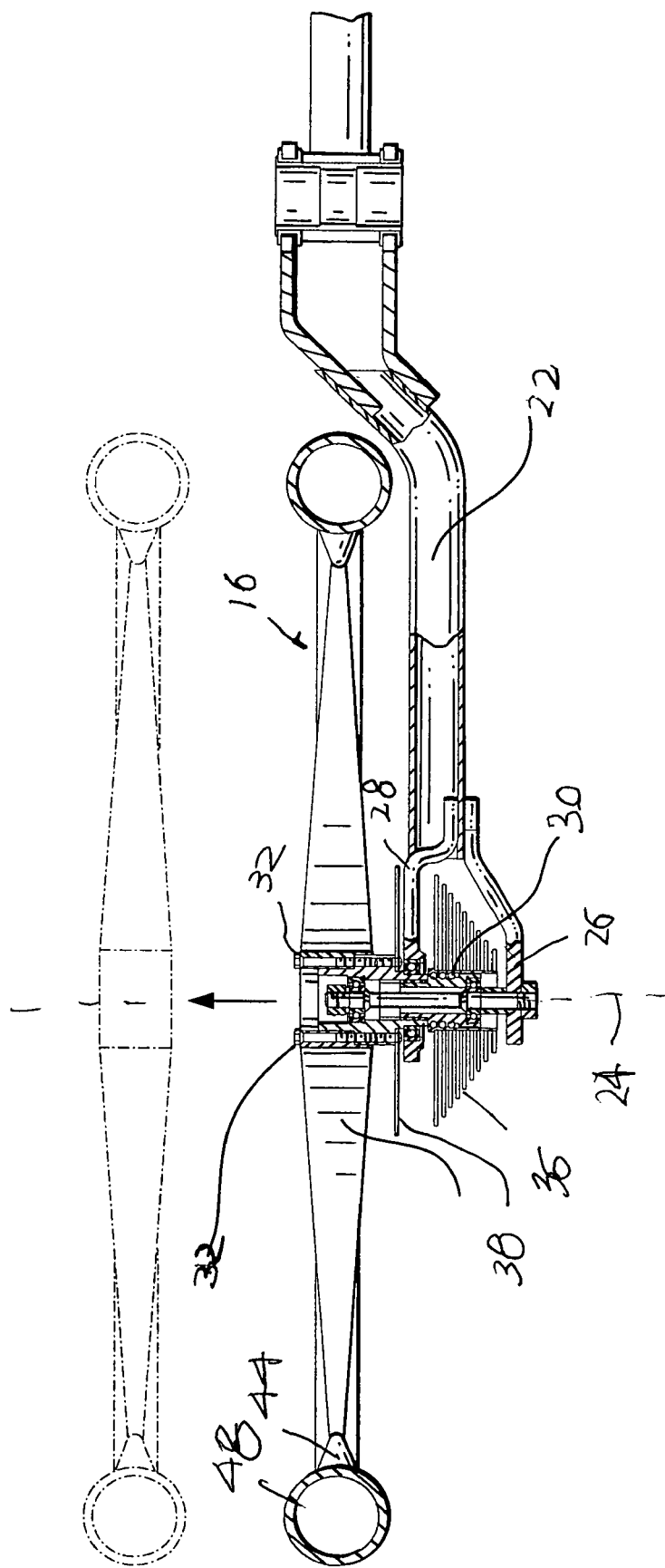
FIG. 2 is a broken-away, enlarged, part-sectional view of a rear region of the bicycle of FIG. 1, and showing axial removal of the wheel in phantom lines.
Figure 3:
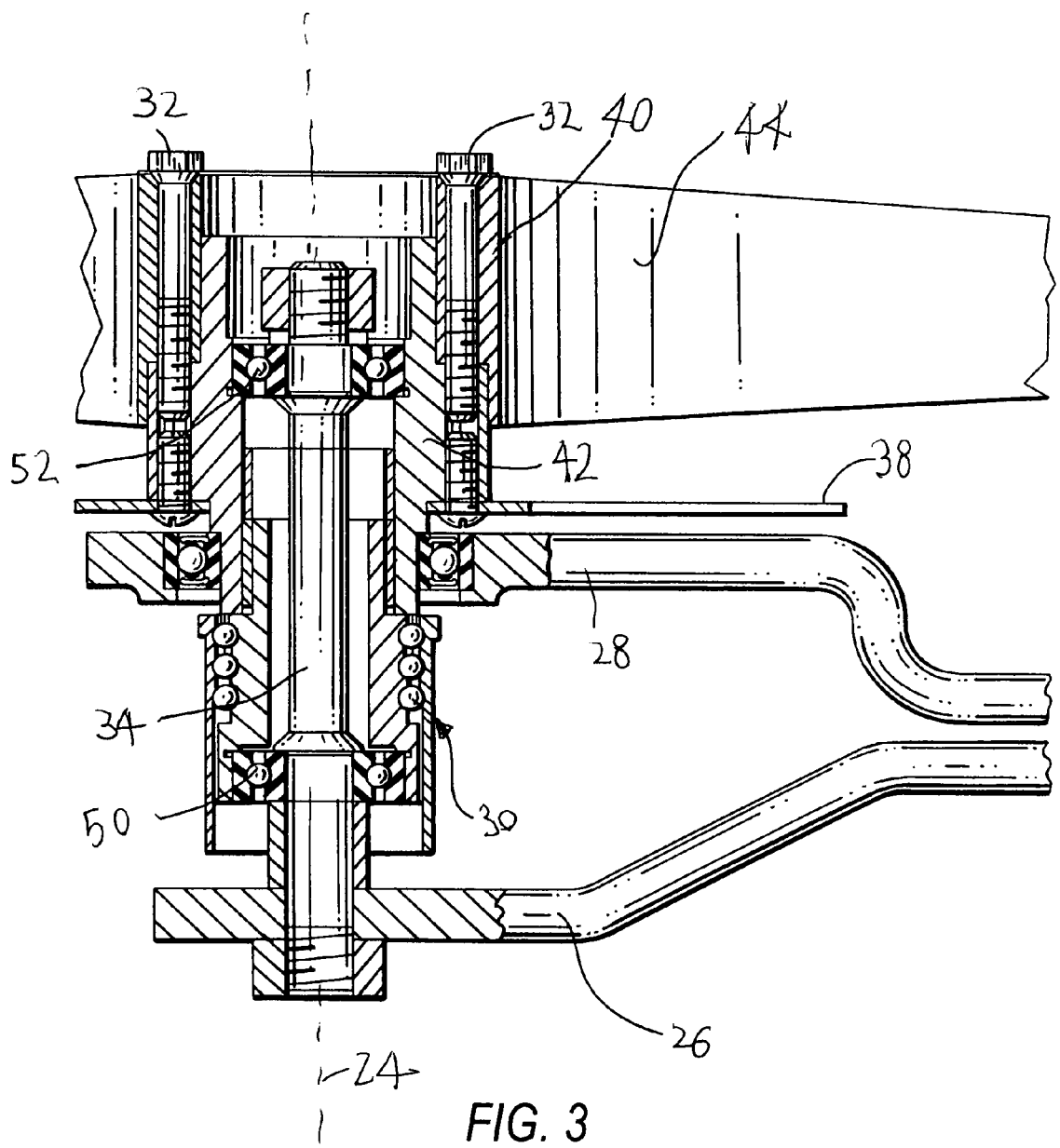
FIG. 3 is a broken-away, enlarged view of a detail of FIG. 2.

As shown in FIG. 2, the rear wheel 16 includes a tire 48 mounted on a rim 44 connected to the central hub 40. The axle 34 extends through the housing 42. Bearings 50, 52 assist in journaling the axle 34.

Upon removal of the bolts 32, the rear wheel 16 is released from the drive mechanism 30. The rear wheel 16 can now be axially removed from the axle 34 along the axis 24, as depicted in FIG. 2. The drive mechanism 30 remains in place and is not removed together with the rear wheel 16. The rear wheel 16 can now be repaired and/or replaced.

Mounting the repaired or a new rear wheel 16 is achieved by reversing the above procedure. The rear wheel is axially returned to the axle 34, and the bolts 32 reconnect the drive mechanism 30.

It will be understood that each of the elements described above, or two or more together, also may find a useful application in other types of constructions differing from the types described above.

For example, the bicycle can be foldable from an initial state in which the front and rear wheels are aligned, one directly behind the other, to a folded state in which the rear wheel is elevated and closer to the front wheel. Another advantageous feature of this invention resides in the feature that the front wheel 14 and the rear wheel 16 can be identical, and that a single spare can be used to replace either the front or rear wheels. In a conventional bicycle, the front and rear wheels are different and cannot be interchanged.

While the invention has been illustrated and described as embodied in a wheel mounting assembly with axial rear wheel removal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A bicycle assembly, comprising:
    a bicycle frame including a rear tube;
    a frame support structure welded to the rear tube for mounting a bicycle wheel for rotation about an axis during bicycle motion, the support structure having a pair of arms spaced axially apart of each other and axially offset from a same axial side of the wheel to enable axial movement of the wheel relative to the arms when the bicycle is not in motion; and
    a drive mechanism supported by both arms, for enabling the wheel to be driven during bicycle motion, the drive mechanism remaining supported by both arms during the axial movement of the wheel.

2. The assembly of claim 1, wherein the drive mechanism includes an axle extending along the axis, and wherein the axle is journaled within the drive mechanism at two locations spaced axially apart.

3. The assembly of claim 1, and a coupler for coupling the drive mechanism to, and decoupling the drive mechanism from, a hub of the wheel.

4. The assembly of claim 1, wherein the drive mechanism includes a clutch and a disc brake.

5. The assembly of claim 1, wherein the bicycle frame is operative for supporting the wheel in a rear region of the frame, and for supporting another wheel in a front region of the frame, and wherein the wheels are aligned along a longitudinal axis, and wherein the frame support structure is connected to the rear region of the frame and is axially offset from the longitudinal axis.

6. The assembly of claim 1, wherein both arms have planar portions in mutual parallelism and lying in planes generally perpendicular to the axis.

7. The assembly of claim 3, wherein the hub is a cylindrical sleeve, and wherein the drive mechanism includes a cylindrical housing axially slidable into and out of the sleeve.

8. A frame for a bicycle having front and rear wheels, comprising:
    a main frame support on which the front wheel is mounted for rotation, the main frame support having a rear tube;
    a rear frame support structure welded to the rear tube of the main frame support for mounting the rear wheel for rotation about an axis during bicycle motion, the support structure having a pair of arms spaced axially apart of each other and axially offset from a same axial side of the rear wheel to enable axial movement of the rear wheel relative to the arms when the bicycle is not in motion; and
    a drive mechanism supported by both arms, for enabling the rear wheel to be driven during bicycle motion, the drive mechanism remaining supported by both arms during the axial movement of the rear wheel.

9. A bicycle, comprising:
    front and rear wheels;
    a main frame support on which the front wheel is mounted for rotation, the main frame support having a rear tube;
    a rear frame support structure welded to the rear tube of the main frame support for mounting the rear wheel for rotation about an axis during bicycle motion, the support structure having a pair of arms spaced axially apart of each other and axially offset from a same axial side of the rear wheel to enable axial movement of the rear wheel relative to the arms when the bicycle is not in motion; and a drive mechanism supported by both arms, for enabling the rear wheel to be driven during bicycle motion, the drive mechanism remaining supported by both arms during the axial movement of the rear wheel.

10. The bicycle of claim 9, wherein the drive mechanism includes an axle extending along the axis, and wherein the axle is journaled within the drive mechanism at two locations spaced axially apart.

11. The bicycle of claim 9, and a coupler for coupling the drive mechanism to, and for decoupling the drive mechanism from, a hub of the rear wheel.

12. The bicycle of claim 9, wherein the drive mechanism includes a clutch and a disc brake.

13. The bicycle of claim 9, wherein the wheels are aligned along a longitudinal axis, and wherein the frame support structure is connected to a rear region of the main frame support and is axially offset from the longitudinal axis.

14. The bicycle of claim 9, wherein both arms have planar portions in mutual parallelism and lying in planes generally perpendicular to the axis.

15. The bicycle of claim 11, wherein the hub is a cylindrical sleeve, and wherein the drive mechanism includes a cylindrical housing axially slidable into and out of the sleeve.

* * * * *